Patented July 2, 1940

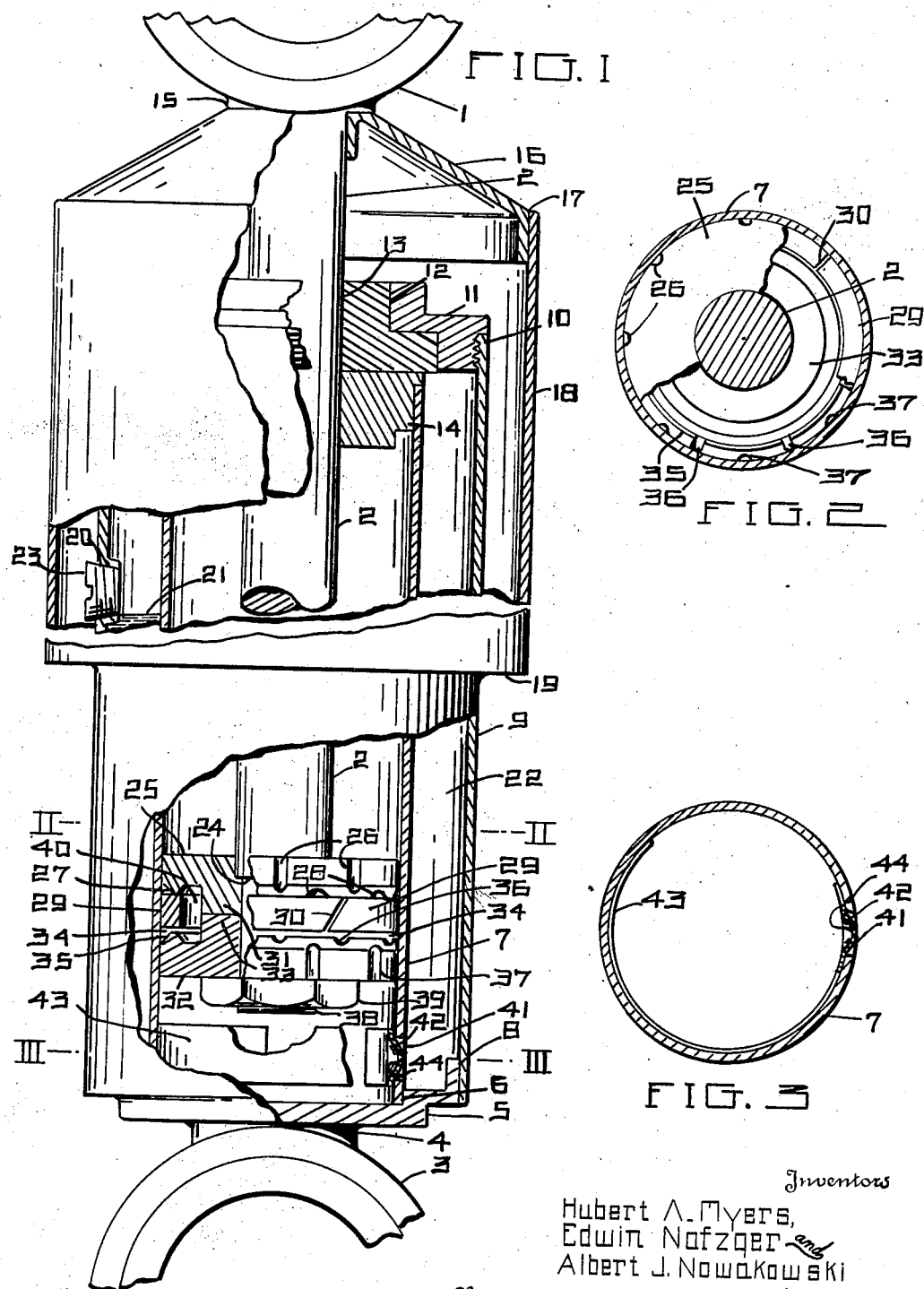

2,206,110

UNITED STATES PATENT OFFICE 2,206,110

SHOCK ABSORBER

Hubert A. Myers, Edwin Nafzger, and Albert J. Nowakowski, Toledo, Ohio, assignors to Toledo Steel Tube Company, Toledo, Ohio, a corporation of Ohio Application July 24, 1939, Serial No. 286,086

8 Claims. (Cl. 188—88)

This invention relates to yieldable take-up connections, especially for smoothing out blows or concussions between relatively movable parts.

This invention has utility when incorporated as quieting or stabilizing means between a motor vehicle body or chassis and its carrying means or axle.

Referring to the drawing:

Fig. 1 is a side elevation, with parts broken away, of an embodiment of the invention in a hydraulic type of shock absorber adapted for motor vehicles;

Fig. 2 is a section on the line II—II, Fig. 1, various portions being broken away to show features of the differential leakage-providing piston; and Fig. 3 is a section on the line III—III, Fig. 1, showing features of the leakage-providing check valve as to communication with the reserve liquid supply from the hydraulic cylinder.

Ring device or eye 1, fixed with piston rod 2, may be in the assembly hereof with a motor vehicle connected to the chassis or spring-supported part. Opposite to this eye 1 is ring or eye 3 which may be connected to the load carrying portion or axle of the motor vehicle. Fixed with this eye 3 by weld 4 is head portion 5 with which there is weld connection 6 for cylinder 7. This head 5 has extent greater than the cylinder 7 and has weld connection 8 with reserve chamber wall 9 surrounding this hydraulic cylinder 7 of the device. This cylinder 7, remote from the head device 5, has connection 10 with head device 11 at gland 12 forming bearing 13 in which the piston 2 is slidable. The cylinder 7 has head 14 at this gland 12. Fixed with the bearing or ring 1 by weld 15 is flare or flange 16 which has weld connection 17 with shield 18 having open bottom 19, which in practice may be in the range of two-thirds to three-quarters of the length of the chamber 9. In the assembly hereof as the bearings 1 and 3 are in position on a vehicle, the chassis may be jacked up or lifted away from the axle to such abnormal position of spacing, as the piston on the piston rod 2 rides toward the head 14, that the open end 19 of this shield 18 exposes port 20, thereby permitting charge of liquid 21 into reservoir 22 having the outer chamber wall 9. A delivery spout or nose-providing oil can may have such spout or nose inserted into the opening or port 20. By so doing there may be a filling for charging of liquid as oil up to the level of this port or opening 20. With this liquid 21 so charged, plug 23 may be inserted and the parts allowed to recede to normal position, thereby shielding this reserve chamber wall 9 and concealing the plug or closure 23.

The piston rod 2 has reduced portion forming shoulder 24 against which is piston element 25 of close clearance as to the inner wall of the chamber 7. The periphery of this piston element 25 is provided with grooves, ways or ports 26 parallel to the axis of the piston rod 2 and at the periphery of this piston portion 25, thereby determining a flow clearance beyond that of the fit relation of this member 25 as to the inner wall of the cylinder 7. This member 25 on its portion away from the head 14 has V-shaped rib 27 with interruptions 28 therein. This V-shaped portion provides a seat for ring 29 having split portion 30. This ring is a yieldable expansible-metal piston type of ring, herein functioning as a check valve in its seating as to the V-shaped interrupted way 27. Complemental to this portion 25, which has extension 31, is opposing section 32 having section 33 toward the section 31 and thereby providing clearance 34 beyond the spacing or dimension for this expansible ring 29. This element 32 opposing the seat 27 has V-seat 35 with interruptions 36 as the complementary portion of this check valve. The element 32 peripherally has ways 37 extending parallel to the axis of the piston rod 2. Threaded portion 38 of this piston rod 2 remote from the shoulder 24 has nut 39 thereon assembling the two piston sections 32, 25, in fixedly anchored position with the loose ring 29 therebetween. These two piston sections 32, 25, have common close fitting with the inner side of the cylinder 7 for ready sliding fit, while the flow clearance or by-pass for liquid flow is increased by the ways 26 as to the section 25 and ways 37 as to the section 32. The respective radial ways 28 in the section 25 and ways 36 in the section 32 as operating in conjunction with the ways 26, 37, provide continuous flow for leakage between the opposite sides of the piston, even were the split ring 29 of dimension to seat upon both of the tapered or pointed seats 27 and 35. However, this clearance 34 is effective so that in operation but one set of the radial openings 36 or 28 provide the control leakage and the functioning is such that this pressure radially outward of the ring 29 at region 40 insures expansion of this ring 29 under the pressure of operation as a snugly fitting piston ring seating in the direction in which the pressures may thrust for the yieldable control sought hereunder.

In practice, the flow capacity for the ports 28 may be greater than the flow capacity for the ports 36. This has meant in instance of practice that wherein the thrust of the piston rod 2 as to the cylinder 7 is such as to cause the piston ring 29 to ride toward the section 25, there was resistance of 35 pounds. At the converse movement, with the ring 29 clear of the seat 27 and against the seat 35, there was built up a pressure of as much as 165 pounds. It is thus seen that to meet an occasion desired according to the mass of the motor vehicle or the desired riding qualities sought, one may readily conform thereto in the differential piston clearance ways or ports. In practice, this snug fitting against the considerable resistance is one seemingly in no way detracting from the life or continued functioning of this device at a maintenance for the initial range for functioning thereof.

In the operation of this hydraulic device as herein disclosed, the cylinder 7 with the differential piston riding toward the bearing 1 would tend to be resisted by the incompressible liquid between the head 14 and the device 25. This direction of travel would tend to increase the capacity of the cylinder 7 on the opposite side of the piston or toward the bearing 3. In the event the by-passing control through this differential piston be not sufficient to supply this liquid volume in the region below the piston, supplemental flow of the liquid 21 from the chamber 22 may be by port 41. This flow as away from the chamber 22 would tend to unseat check valve dome 42 as urged into this port 41 by arc-shaped spring tail portion 43 thereof fitting against the inner wall of this cylinder 7. This is accordingly a check valve for ready response of reserve liquid flow from the chamber 22 into the hydraulic cylinder 7.

However, in reverse functioning of this piston rod 2 in travel away from the head 14, there is the permitted differential leakage past this piston device 25, 32. This build-up of pressure toward the bearing 3 is not in direct communication with the reserve chamber liquid 21 in the chamber 22, for this check valve dome 42 is snugly seated by this direction of flow. However, this dome 42 as in the seat 41 has a tapered throat way having a relatively small open port 44. This tapering is from the hydraulic cylinder 7 narrowing or restricting toward the chamber 22. This means that this is a check valve with a considerable resistance to flow into the reserve chamber 22 due to the slow flow seepage through the small port 44 but with a freedom for reverse flow from the chamber 22 through the larger primary port 41 into the hydraulic cylinder 7. In practice, there may be no purpose to vary this leakage port capacity. Accordingly, with such port 44 initially determined as may be the purpose in the apparatus installed, it is substantial in maintaining such relation.

In the apparatus as herein disclosed there is simplicity in design throughout with the elements substantial, adaptable for quick and simple assembly to conform to the desired range of use.

What is claimed and it is desired to secure by United States Letters Patent is:

1. A yieldable take-up connection adapted to be installed between a load-carrying axle and a chassis thereon of a motor vehicle, comprising a piston and cylinder device, a reserve liquid chamber housing the cylinder, a shield for the chamber carried by the piston and having a skirt adapted to be telescoped to an abnormal position to expose a filling port for the chamber and adapted therethrough to receive a charge of liquid, and a closure for said port, said closed port being normally shielded by the skirt.

2. A hydraulic take-up device comprising a cylinder, and a differential-action piston therein including a body having longitudinally thereof two series of grooves and an intermediate annular channel, and in the channel an expansible split ring check valve shiftable relatively to the body to seat at one series of grooves at one position and at the other series of grooves at another position of the body relatively to the ring.

3. A hydraulic take-up device comprising a cylinder, a differential-action piston therein including an expansible split ring, a piston body having grooves extending away from the ring, and clearance-providing seat means for the ring to shift relatively to the body to seat at the grooves into check valve position.

4. A hydraulic take-up device comprising a cylinder, a differential-action piston therein including an expansible split ring, a piston body having grooves oppositely extending away from the ring, and by-pass clearance-providing seat means for the ring to shift relatively to the body to seat at the grooves into opposite check valve positions.

5. A hydraulic take-up device comprising a cylinder, a differential-action piston having a by-pass providing body formed with peripheral grooves oppositely from an intermediate annular channel and a split expansible ring loosely in the channel adapted to function as a check valve and be shifted relatively to the piston into groove closing position.

6. A hydraulic take-up device comprising a cylinder, a differential-action piston having a rigid body forming an intermediate annular channel with walls providing interrupted opposing ribs, and a split expansible ring loosely in the channel and adapted to be shifted relatively to the body into rib-engaging position as a check valve.

7. A yieldable take-up connection adapted to be installed between a load-carrying axle and a chassis thereon of a motor vehicle, comprising a piston and cylinder device, a reserve liquid chamber housing the cylinder, a shield for the chamber carried with the piston and movable to expose the chamber at abnormal position and adapted to shield a major portion of the chamber at normal position, there being a filling port for the chamber exposed at said abnormal position of the shield as to the cylinder, which filling port is sufficiently spaced from the end of the chamber to limit charging of the chamber with liquid less than full for said chamber.

8. A shock absorber comprising a cylinder, a piston therein having two sections and an intermediate channel, said sections each provided with ports, and a peripherally yieldable split ring in the channel between said sections relatively shiftable as to the piston and partially closing the ports of one of said sections in one direction of said shifting and for partially closing the ports of the other of said sections in the other direction of said shifting.

HUBERT A. MYERS.
EDWIN NAFZGER.
ALBERT J. NOWAKOWSKI.